May 28, 1929.　　　P. R. BASSETT　　　1,715,270
RADIO DIRECTION AND POSITION FINDER
Filed Feb. 19, 1923　　2 Sheets-Sheet 1
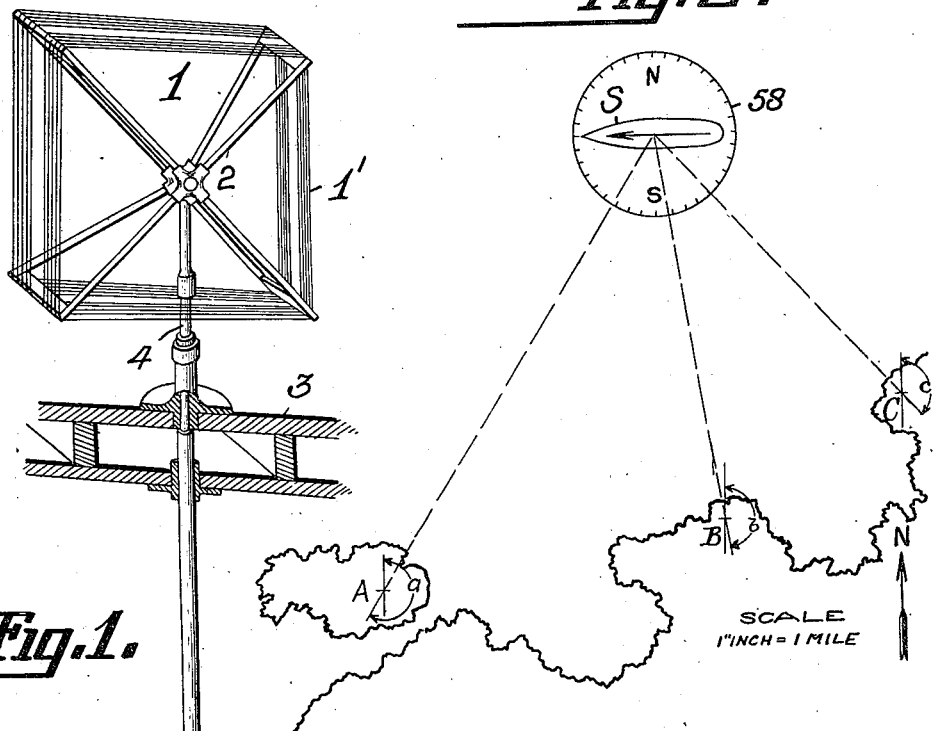
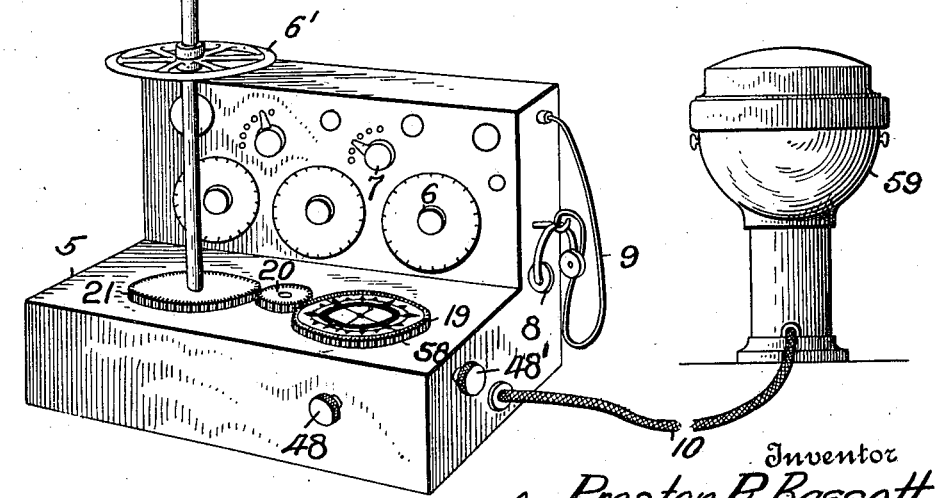
Inventor
Preston R. Bassett.
By his Attorney
Herbert H. Thompson

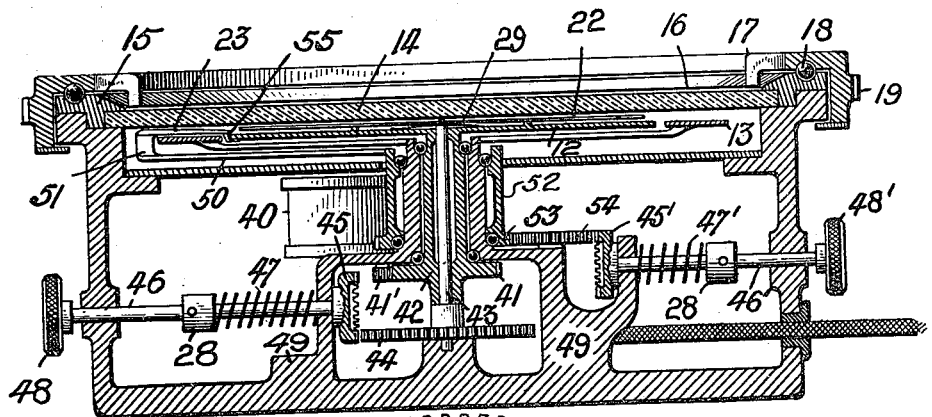
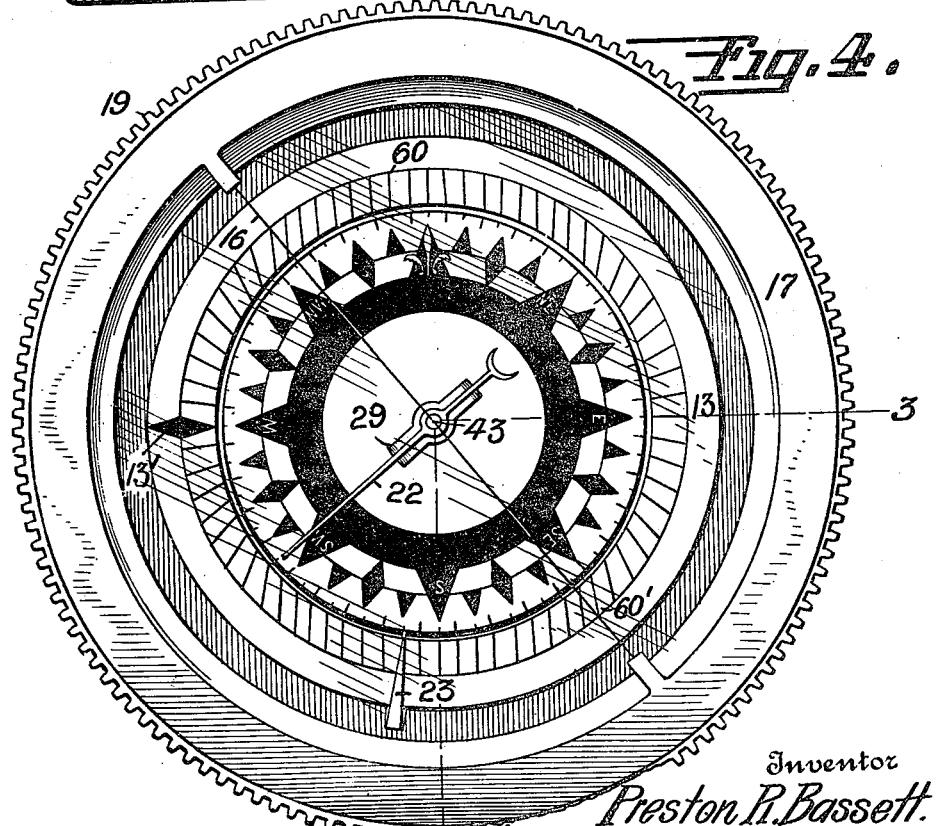

Patented May 28, 1929.

1,715,270

UNITED STATES PATENT OFFICE.

PRESTON R. BASSETT, OF BROOKLYN, NEW YORK, ASSIGNOR, BY MESNE ASSIGNMENTS, TO SPERRY GYROSCOPE COMPANY, INC., A CORPORATION OF NEW YORK.

RADIO DIRECTION AND POSITION FINDER.

Application filed February 19, 1923. Serial No. 619,843.

This invention relates to the art of navigation by the aid of radio direction signals and more particularly, to the system of navigation wherein a plurality of shore stations transmit or broadcast radio signals of different characteristics, and the ship is equipped with some form of radio direction finder, whereby the direction from which the signals come may be determined by the ship.

More particularly the invention relates to an improvement in radio direction finder per se whereby not only the apparent direction with respect to the ship may be determined, but the direction in azimuth of the sending stations may be shown directly to the navigating officer, so that by means of charts, the officer may readily determine the exact position of the ship, without the necessity for taking bearings from the sun, or relying on dead reckoning.

I am aware that apparatus of this nature has been proposed in which an attempt has been made to combine in some way the ship's magnetic compass with a radio direction finder. Such attempts have in so far as I am aware, not met with the success that was hoped for.

According to my invention, I employ in connection with a radio direction finder, a bearing indicator, or repeater compass, actuated primarily from a gyroscopic compass, and a construction radically different from that heretofore attempted with magnetic compasses.

A further improvement effected by me is in the method of mounting the compass itself in connection with the radio receiving apparatus, and in the connection between the compass and radio direction finder.

Referring to the drawings in which my invention is shown in more or less diagrammatic form, Fig. 1 shows one construction of my invention which may be termed a gyroscopic-radio position indicator.

Fig. 2 shows the method of employing my invention in determining the position of a ship.

Fig. 3 is a vertical section on a larger scale of my bearing indicator, proper, the section being taken on broken line 3—3 of Fig. 4.

Fig. 4 is a top plan view of the instrument shown in Fig. 3.

Referring to Fig. 1, 1 represents the radio antenna consisting of a closed coil (inductance type) of several lays of wire 1' wound on a suitable wooden, or other frame 2. Said frame is rotatably mounted above the deck 3 of the ship, as by being supported on a vertical shaft 4. As will be well understood by those skilled in the art, when the plane of such coil is turned parallel to the direction from which a radio signal emanates, the intensity of the signal will be a maximum. As the coil is revolved, the intensity of the signal diminishes, until a minimum is reached, when the plane of the coil comes to a position at right angles to the line of direction from the signal. This minimum, which is well defined, may be determined with sufficient accuracy for navigational purposes, and may therefore be used in my system of taking bearings by radio. The shaft 4 may be brought down and led directly into the container 5 of the radio receiving set. Said container is shown as provided with the usual tuning and resistance adjustments 6, 7, and with the head telephones 8, which may be connected by a short wire 9 to the box, since according to my invention, the operator may wear the headpiece and stand directly by the radio box and compass, and not be compelled to keep away from the compass, as in the present device. The shaft 4 is shown as provided with a handwheel 6', or other means for adjusting the position of the coil 1 in azimuth. Within the same box 5, I prefer also to mount the bearing indicator 58. Said indicator preferably comprises a repeater compass adapted to be actuated from a master gyroscopic compass 59 through electric cable 10, in the manner well known in the art, for instance see patent Sperry No. 1,296,440, March 4th, 1919. Said bearing indicator therefore, being governed by the master compass may be rigidly mounted in the box 5 in any position and need not be suspended in gimbals, since it is totally unaffected by the roll and pitching of the ship. The indicator is shown as mounted within a box 5 and includes preferably a compass card 12, the lubbers ring 13 bearing the lubbers mark or index 13', and the glass cover 14 clamped in bezel ring 15. The card is shown as actuated from a repeater motor 40, said motor being in circuit with a transmitter (not shown), on the gyro-compass 59, as will be well understood by those skilled in the art. Motor 40 is shown as operating the card through a pinion 41′ on the motor shaft meshing with a gear 41 on sleeve 42, said sleeve being journaled on the spindle 43. Said sleeve is shown as carrying at its top the card 12.

Directly on top of the indicator, I mount an index 16 which may be in the form of a cross-wire extending diametrically across a ring 17 rotatably mounted on top of the bezel 15, as by anti-friction balls 18. Said index 16 preferably lies immediately above the compass card 12, so as to avoid as much as possible, a parallax error. Said index is maintained in any suitable manner in a definite position with respect to the coil 1, preferably parallel to the axis of the coil. In order that an unobstructed view of the compass card may be obtained, I prefer to mount the indicator to one side of the shaft 4 as shown, and to connect the ring 17 to the shaft 4 by means of any suitable form of gearing. As shown, the outer periphery of the ring 17 is provided with teeth 19 which mesh with an idler 20, said idler in turn meshing with a gear 21, secured to shaft 4 and preferably having the same number of teeth as the ring 17.

Preferably also, I equip the indicator with one or more additional indices 22 and 23. Index 22 is shown as in the form of a pointer secured to the shaft 43, said shaft carrying adjacent its lower end, a gear 44 with which a crown gear 45 is adapted to mesh when pushed inwardly. Said crown gear is shown as mounted on a slidable rotatable shaft 46 which is normally held outwardly by compression spring 47 operating between the collar 28 on said shaft and the bracket 49 in which the inner end of the shaft is journaled. The shaft 46 is provided with a handle 48. It will be readily apparent that by pushing in on the handle 48 and rotating the same, the pointer 22 may be adjusted in any desired position. Means, such as friction spring washer 29 are provided however, normally to cause the pointer 22 to turn with the compass card 12, when the gears 44, 45 are out of mesh, so that when the pointer is set on the card to any desired position, it will remain there, regardless of the turning of the ship. The pointer 23 is shown as secured to an arm 50 which lies below the card, and is provided at its outer end with a vertical extension 51, so that the pointer lies above the stationary lubbers ring 13. The arm 50 is secured to the hollow hub or sleeve 52 which may be provided at its lower end with teeth 53, with which idler 54 meshes. The crown gear 45′, similar in construction and operation to crown gear 45, together with compression spring 47′ and handle 48′, are provided for adjusting the position of the pointer 23, so that this pointer is likewise adjustable to any position on the card. It may also be provided with friction bearing surface 55, resting against the periphery of the card, so that it will normally turn with the card, but may be independently adjusted.

While it is true that under perfect conditions, the coil antenna 2 when turned to receive the minimum signal from a station will be turned with its axis in line with the station, quite pronounced deviations have been found when receiving on shipboard. This has been found to be due to the distortion caused by the metallic structure of the ship itself, and is thus probably unavoidable, although it can be corrected for. I am aware that it has been proposed to prepare a correction scale by "boxing the compass", in other words, by taking observations with the ship turning around a complete circle, so that when a reading is taken, by referring to the correction table, the observer may ascertain what correction is to be applied. Then by making certain calculations, the true direction of the sending station my be determined. By my invention, however, I eliminate the necessity for any computations of this nature, or reference to tables, by mounting directly on the compass, a correction device, which when properly read in connection with the compass, will show without calculation or mental computation, the true reading. Preferably, I graduate the lubbers ring 13 or other fixed part of the compass with special markings 60. Said markings consist of more or less radial lines which are placed on the lubbers ring at an angle to the true radii, dependent upon their position with reference to the fore and aft line, or lubbers line of the ship. As shown, the ship is heading in the direction of the lubbers mark 13′, and at that point, and at 180 degrees thereto, there being no error, the markings 60 are radial. As the lines advance in a clockwise direction from the mark 13′, it will be noted that they assume an upward slant until a maximum is reached in the vicinity of about 45 degrees, where the slant is decreased until they are again radial at 90 degrees. In the next quadrant, the slant of the lines is again increased to a maximum in the vicinity of 45 degrees and back again to radial at 180 degrees, but it will be observed that the lines in this quadrant slant in the opposite direction from the lines in the preceding quadrant. This is for the reason that the error in two adjacent quadrants is always opposite. The third and fourth quadrants are similarly prepared. The manner in which the cross-wire 16 is read on the card is by observing where the line 16 intersects, or is, so to speak, tangential to the outer end of a slant line 60, for instance, line 60′. The reading of the card is then taken as the angle indicated where the line 60′ intersects the card. In the illustration shown in Fig. 4, the compass reading is 135 degrees, or S. E.

One use of my invention may be understood by reference to the chart shown in Fig. 2. The ship is represented at S, while at A, B and C, are three shore stations, which send out periodically, radio signals of known characteristics, or at known intervals. The points of the compass as they appear on the repeater card are shown at 58, while north is also marked on the chart by the arrow N. We will suppose that the ship picks up station A first and the navigator by turning the coil 1 determines that the station A lies in the direction of 210 degrees from north, by reading the index 16 on the card 12 as explained above. He then desires to know the position of station B for instance, but before turning his coil to obtain a minimum signal from B, he preferably moves one of the auxiliary pointers, say 22, into line with the reading 210 degrees, where he allows it to remain.
Then the coil 1 is turned to receive the minimum signal from station B, where the process is repeated, the index 23 being positioned in line with the corrected compass reading in this position. If desired, the direction of station C may likewise be determined. The navigator then has before him at a glance, the correct directions in azimuth of the three sending stations, shown by pointers 22, 23 and 16, the latter being read as explained above. He may then by referring to his navigating chart and his table showing the characteristics of the signals sent out by the different stations, determine at once his position, by laying out angles $a$, $b$, and $c$ on his chart, equal respectively to the angles shown by the compass card pointers 22, 23 and 16.

The auxiliary pointers 22 and 23 also prove of great assistance in making observations, since they eliminate any error that might be due to change in the ships heading between the taking of the various observations, and errors in noting down readings.

Also since the compass card 12 is actuated from a gyroscopic compass, at which point all other corrections are applied, no other corrections are necessary, as would be the case if an attempt were made to employ the magnetic compass, and the readings may be taken as true bearings in azimuth, without computations or allowances.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. In a radio position finder for ships, a casing, said casing containing a repeater motor actuated by a gyro compass, a compass card, a plurality of direction indices having axes concentric with said card, hand-operated means mounted in said casing and normally ineffective but operable to effective position for setting certain of said indices, a radio direction finder and a connection between said finder and the other of said indices.

2. In a radio position finder for ships, a casing, said casing containing a repeater motor actuated by a gyro compass, a compass card, a plurality of pointers having axes concentric with said card, hand-operated means mounted in said casing and normally ineffective but operable to effective position for setting said pointers, a ring journaled on said casing concentric with said card, and a lubber line carried by said ring; a radio direction finder and a connection between said finder and said ring.

In testimony whereof I have affixed my signature.

PRESTON R. BASSETT.